US012561608B2

(12) United States Patent　　　　　(10) Patent No.: US 12,561,608 B2
Beaurepaire et al.　　　　　　　　　(45) Date of Patent: Feb. 24, 2026

(54) APPARATUS AND METHODS FOR PREDICTING SLIPPING EVENTS FOR MICROMOBILITY VEHICLES

(71) Applicant: HERE GLOBAL B.V., Eindhoven (NL)

(72) Inventors: Jerome Beaurepaire, Nantes (FR); Nicolas Neubauer, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 937 days.

(21) Appl. No.: 17/832,519

(22) Filed: Jun. 3, 2022

(65) Prior Publication Data

US 2023/0394353 A1　　　Dec. 7, 2023

(51) Int. Cl.
G06N 20/00　　　　　(2019.01)
(52) U.S. Cl.
CPC ....................................... G06N 20/00 (2019.01)
(58) Field of Classification Search
CPC .... G06N 20/00; G08G 1/0112; G08G 1/0129; G08G 1/0145; G08G 1/048; G08G 1/205
See application file for complete search history.

(56) References Cited

U.S. PATENT DOCUMENTS

| | | | |
|---|---|---|---|
| 2005/0168066 A1* | 8/2005 | Svendenius | ........... B60T 13/741 |
| | | | 303/150 |
| 2020/0247498 A1 | 8/2020 | Yamamoto | |
| 2021/0097854 A1 | 4/2021 | Guim Bernat et al. | |
| 2021/0188269 A1* | 6/2021 | Zhang | ................. H04L 63/1416 |
| 2021/0261165 A1 | 8/2021 | Averbuch et al. | |
| 2021/0350150 A1 | 11/2021 | An et al. | |

* cited by examiner

*Primary Examiner* — Pei Yong Weng
(74) *Attorney, Agent, or Firm* — Peter H. Yu; HERE GLOBAL B.V.

(57)　　　　　　ABSTRACT
An apparatus, method and computer program product are provided for predicting slipping events for micromobility vehicles. In one example, the apparatus receives input data indicating a target location and including contextual data associated with the target location. The apparatus causes a machine learning model to generate output data as a function of the input data. The output data indicate a likelihood in which a target micromobility vehicle will slip at the target location. The machine learning model is trained to generate the output data as a function of the input data by using historical data indicating events in which micromobility vehicles have slipped. The historical data indicate slip-inducing objects within locations of the events, proximity of sources of the slip-inducing objects relative to the locations, and one or more factors that cause the slip-inducing objects to be disposed within the locations.

18 Claims, 9 Drawing Sheets

APPARATUS AND METHODS FOR PREDICTING SLIPPING EVENTS FOR MICROMOBILITY VEHICLES

TECHNICAL FIELD

The present disclosure generally relates to the field of roadside event prediction, associated methods and apparatus, and in particular, concerns, for example, an apparatus configured to predict slipping event for micromobility vehicles based on contextual data associated with locations.

BACKGROUND

Micromobility vehicles, such as electric scooters, are increasingly becoming a common means of transportation within a road network. While micromobility vehicles are designed for traversing paved road surfaces, such vehicles are susceptible to certain road conditions that might not adversely impact other types of vehicles. For example, a medium vehicle may be able to traverse a paved road having sand/gravel disposed thereon with better traction than a micromobility vehicle due the medium vehicle having a greater amount of surface area for contacting the ground. Therefore, there is a need in the art for predicting events in which slipping events will occur for micromobility vehicles and providing notifications indicating such events to users of said vehicles.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: receive historical data indicating events in which micromobility vehicles have slipped, the historical data indicating slip-inducing objects within locations of the events, proximity of sources of the slip-inducing objects relative to the locations, and one or more factors that cause the slip-inducing objects to be disposed within the locations; and using the historical data, training a machine learning model to generate output data as a function of input data, wherein the input data indicate a target location and include contextual data associated with the target location, and wherein the output data indicates a likelihood in which a target micromobility vehicle will slip at the target location.

According to a second aspect, a non-transitory computer-readable storage medium having computer program code instructions stored therein is described. The computer program code instructions, when executed by at least one processor, cause the at least one processor to: receive input data indicating a target location and including contextual data associated with the target location; and cause a machine learning model to generate output data as a function of the input data, wherein the output data indicate a likelihood in which a target micromobility vehicle will slip at the target location, wherein the machine learning model is trained to generate the output data as a function of the input data by using historical data indicating events in which micromobility vehicles have slipped, and wherein the historical data indicate slip-inducing objects within locations of the events, proximity of sources of the slip-inducing objects relative to the locations, and one or more factors that cause the slip-inducing objects to be disposed within the locations.

According to a third aspect, a method of providing a map layer of one or more slipping events for a target micromobility vehicle is described. The method comprising: receiving input data indicating a target location and including contextual data associated with the target location; causing a machine learning model to generate output data as a function of the input data, wherein the output data indicate a likelihood in which the target micromobility vehicle will slip at the target location, wherein the machine learning model is trained to generate the output data as a function of the input data by using historical data indicating events in which micromobility vehicles have slipped, and wherein the historical data indicate slip-inducing objects within locations of the events, proximity of sources of the slip-inducing objects relative to the locations, and one or more factors that cause the slip-inducing objects to be disposed within the locations; and updating the map layer to include a datapoint indicating the output data at the target location.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

As discussed above, micromobility vehicles are susceptible to certain road conditions that might not adversely impact other types of vehicles due to the micromobility vehicles being small, lightweight vehicles and having a limited amount of surface area for contacting the ground. For example, if a micromobility vehicle and a C-segment medium vehicle are traversing a road segment having wet metal road plates and/or manhole covers, the C-segment medium vehicle maintains a higher level of traction than the micromobility vehicle in that the C-segment medium vehicle has a greater number of wheels and the size of each wheel of the C-segment medium vehicle is greater than that of the micromobility vehicle. As such, even if an entire wheel of the C-segment medium vehicle is contacting a wet metal surface, the other three wheels thereof may be contacting a pavement surface, thereby enabling the C-segment medium vehicle to maintain a "high" level of traction for the C-segment medium vehicle. Additionally, micromobility vehicles may be frequently subject to adverse road conditions in comparison to other types of vehicles. For example, micromobility vehicles are typically driven within or near sides of a road (e.g., bike lanes, sidewalks, etc.), and since other types of vehicles (including street sanitation vehicles) do not frequently traverse said areas of the road, slip-inducing objects, such as sand, dirt, gravel, leaves, garbage, etc., typically accumulate in said areas of the road, thereby increasing the chance in which micromobility vehicles are impacted by slipping events. Systems and methods for predicting slipping events for micromobility vehicles will be described in detail, herein.

Figure 1:
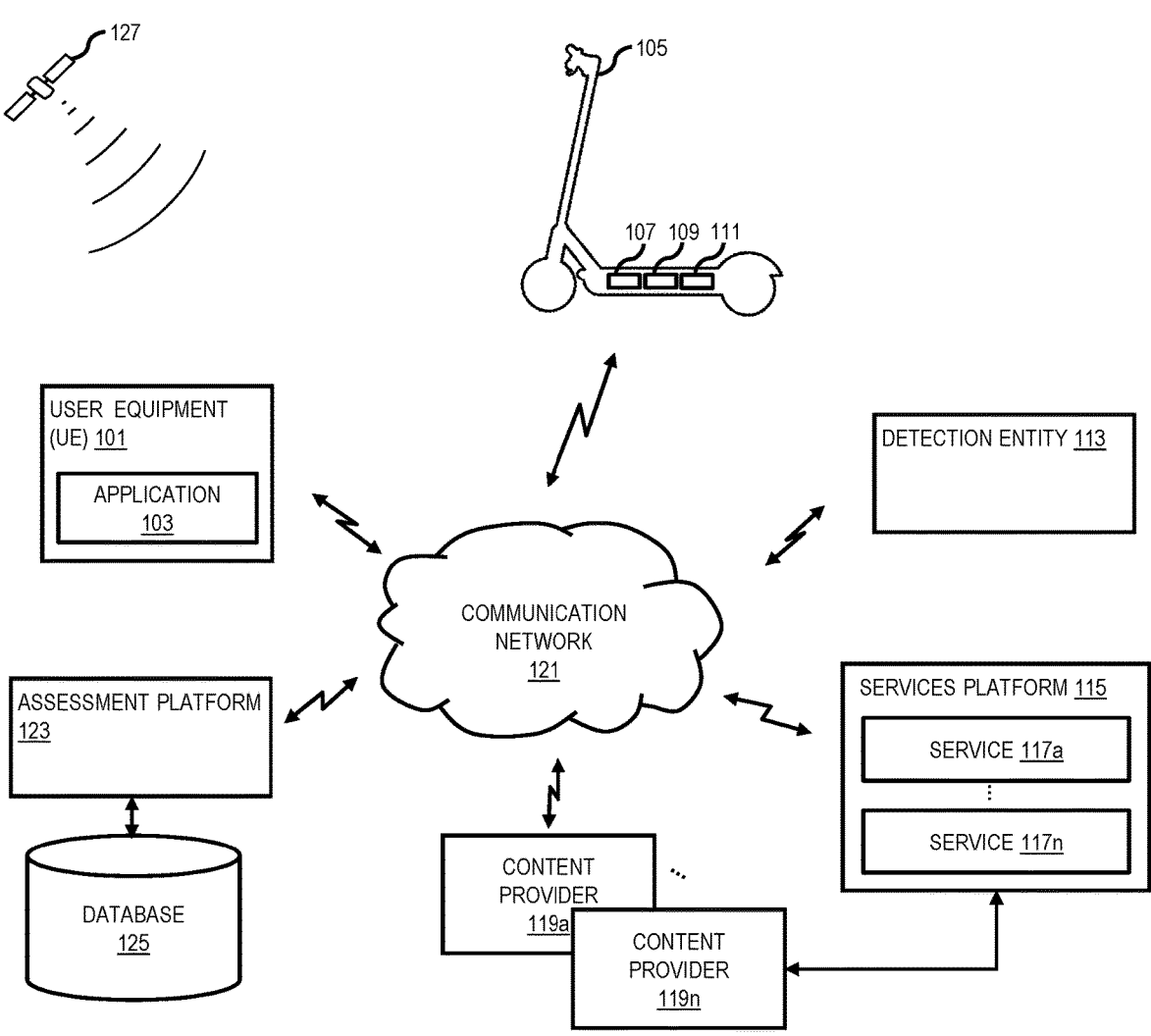
FIG. 1 illustrates a diagram of a system capable of predicting slipping events for micromobility vehicles.

FIG. 1 is a diagram of a system 100 capable of predicting slipping events for micromobility vehicles, according to one embodiment. The system includes a user equipment (UE) 101, a vehicle 105, a detection entity 113, a services platform 115, content providers 119a-119n, a communication network 121, an assessment platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the assessment platform 123 via the communication network 121. The assessment platform 123 performs one or more functions associated with predicting slipping events for micromobility vehicles. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the assessment platform 123 and perform one or more functions associated with the functions of the assessment platform 123 by interacting with the assessment platform 123 over the communication network 121. The application 103 may be used convey information regarding predictions of slipping events for micromobility vehicles. For example, the application 103 may indicate a likelihood in which a slipping event will occur for a micromobility vehicle and provide a route based on the location of the slipping event (e.g., providing a route that avoids the location).

The vehicle 105 is a micromobility vehicle. Micromobility vehicles are small, lightweight vehicles operating at speeds typically below 25 km/h (15 mph) and driven by users personally. In one embodiment, a micromobility vehicle is classified as a vehicle having a gross vehicle weight of less than 500 kilograms (1,100 lb) and top speeds above 45 km/h (28 mph) and excluding devices with internal combustion engines. Micromobility vehicles may be bicycles, e-bikes, scooters, electric scooters, skateboards, electric skateboards, electric pedal assisted bicycles, unicycles, and/or electric unicycles. In one embodiment, a micromobility vehicle may be a human powered vehicle, an electrically powered vehicle, or a combination thereof.

In one embodiment, the vehicle 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the vehicle 105 along a path of travel, etc. In a further embodiment, one or more of the sensors 107 about the perimeter of the vehicle 105 may detect the relative distance of the vehicle 105 from stationary objects (e.g., construct, wall, etc.), road objects, lanes, or roadways, the presence of other vehicles, pedestrians, traffic lights, road features (e.g., curves) and any other objects, or a combination thereof. Said sensors 107 may also detect orientations of such objects. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the assessment platform 123, the UE 101, the services platform 115, one or more of the content providers 119a-119n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be another vehicle, a drone, a user equipment, a road-side sensor, or a device mounted on a stationary object within or proximate to a road segment (e.g., a traffic light post, a sign post, a post, a building, etc.). The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the assessment platform 123 and/or other components within the system 100.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the assessment platform 123, the database 125, or other entities communicatively coupled to the communication network 121 through the service platform 115. In one embodiment, the services platform 115 uses the output data generated by of the assessment platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the assessment platform 123, or the combination thereof. In one embodiment, the content provided may be any type of content, such as map content, textual content, audio content, video content, image content, etc. In one embodiment, the content providers 119 may provide content that may aid in predicting slipping events for micromobility vehicles, and/or other related characteristics. In one embodiment, the content providers 119 may also store content associated with the UE 101, the vehicle 105, services platform 115, the assessment platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 123 may be a platform with multiple interconnected components. The assessment platform 123 may include multiple servers, intelligent networking devices, computing devices, components and corresponding software for predicting slipping events for micromobility vehicles. It should be appreciated that that the assessment platform 123 may be a separate entity of the system 100, included within the UE 101 (e.g., as part of the applications 103), included within the vehicle 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), other platforms embodying a power supplier (not illustrated), or a combination thereof.

The assessment platform 123 is capable of: (1) acquiring historical data indicating events in which micromobility vehicles have slipped; (2) training a machine learning model to predict a slipping event for a micromobility vehicle by using the historical data; and (3) cause the machine learning model to predict a slipping event for a micromobility vehicle; and (4) providing applications to mitigate occurrences of slipping events for the micromobility vehicle based on the prediction. The assessment platform 123 embodies a machine learning model and trains the machine learning model to output the prediction of slipping events for micromobility vehicles by using historical data as training data set.

The historical data include sensor data acquired by sensors equipped by the micromobility vehicles. The sensor data include readings indicating that the micromobility vehicles have slipped. For example, a traction sensor, an accelerometer, and/or a gyro sensor equipped by the micromobility vehicle may generate readings indicating that the vehicle has slipped. The historical data include additional sensor data, such as image data acquired by one or more cameras equipped by the micromobility vehicles and/or one or more detection entities 113 proximate to the locations of the events during the periods of the events. The sensor data may define data acquired during periods in which slipping events for micromobility vehicles have occurred, preceding periods leading up to the periods, following periods subsequent to the periods, or a combination thereof. The sensor data indicate, for each slipping event of the historical data: (1) one or more images of a setting of said slipping event;

(2) one or more levels of coefficient of friction at the location of the slipping event; (3) one or more speed levels at which a micromobility vehicle was traversing during said slipping event; (4) a maneuver executed by the micromobility vehicle during said slipping event (e.g., braking, steering, acceleration, or a combination thereof); (5) an angle or inclination/declination of the location of the slipping event; (6) an amount of weight exerted on the micromobility vehicle; (7) a degree at which the micromobility has slipped (e.g., a slight slip or the micromobility vehicle has fallen); (8) whether a user of the micromobility has moved relative to the micromobility vehicle (e.g., a user swinging the upper body thereof or jumping on the micromobility vehicle); (9) tire pressure levels of the micromobility vehicle; or (10) a combination thereof. The one or more images may be classified (e.g., by the assessment platform 123 and/or other entities capable of image processing) to indicate: (1) a type of terrain on which the slipping event has occurred; (2) presence of slip-inducing objects (e.g., sand, gravel, leaves, garbage, etc.) within the location of the slipping event; (3) a type of slip-inducing objects; (4) presence of sources that generate or accumulate slip-inducing objects (e.g., trees, plants, construction sites, garbage cans, etc.); (5) a weather condition that was impacting the slipping event; (6) one or more light attributes (e.g., light contrast level or light intensity) associated with the location of the slipping event; (7) presence of precipitation at the location of the slipping event; (8) proximity of one or more types of point-of-interests (POIs) with respect to the location of the slipping event; or (9) a combination thereof. The one or more images may also indicate other attributes associated with the slipping event, such as road attributes (e.g., a type of road segment, a classification of a road segment, a curvature of a road segment, a number of lanes within a road segment, a lane width of a road segment, traffic rules associated with a road segment, one or more conditions of a road segments, a number and severity of each crack or pothole within a road segment, difference in orientations between a concrete pavement and one or more neighboring concrete pavements, etc.) associated with the location of the slipping event, presence of road objects (e.g., lane markings, traffic signs, sign posts, traffic lights, etc.) within the location of the slipping events, presence of other vehicles, pedestrians, and/or construction sites within the location of the slipping events, or a combination thereof.

The historical data are not limited to data acquired by the micromobility vehicle. In one embodiment, the historical data further include data acquired from various sources, such as one or more detection entities 113, the services platform 115, content providers 119, the database 125, etc. Such data may indicate: (1) road attributes associate with the location of the slipping event; (2) a location/orientation of one or more road objects within the location of the slipping event; (3) one or more types of terrains within the location of the slipping event; (4) an angle or inclination/declination of the location of the slipping event; (5) locations and types of sources that generate slip-inducing objects within or proximate to the location of the slipping event; (6) a weather condition that has impacted the slipping event; (7) one or more POIs within or proximate to the location of the slipping event; or (8) a combination thereof.

The historical data further include contextual data associated with the slipping event. The contextual data may indicate reasons as to why the slipping event has occurred at the location of the event. For example, the historical data may include data indicating a schedule in which a street sanitation entity cleans and disposes garbage, leaves, dirt, gravel, and/or other slip-inducing objects within a location of a slipping event. If the data indicates that the street sanitation entity has not cleaned the location for a long duration, the contextual data may indicate that the likelihood in which the location includes slip-inducing objects is at a "high" level, and the reason for the occurrence of the slipping event is due to the presence of the slip-inducing objects within the location. The historical data may also include data indicating a schedule in which one or more waste containers within the location of the slipping event is emptied. As such, if the waste containers are not emptied for a long duration, the contextual data may indicate that the likelihood in which the location includes slip-inducing objects is at a "high" level, and the reason for the occurrence of the slipping event is due to the presence of the slip-inducing objects within the location. In one embodiment, the contextual data may be associated with data indicating one or more POIs within or proximate to a location of a slipping event. For example, if a factory that is known to generate debris such as sand, gravel, small rocks, etc. is connected to a road segment in which a slipping event has occurred, the contextual data may indicate that the reason for the occurrence of the slipping event is due to a frequency in which the factory outputs the slip-inducing objects within the road segment of the slipping event. In one embodiment, the contextual data may be associated with data indicating one or more road events within or proximate to the location of the slipping event. For example, if a construction work has occurred within a location of a slipping event, the contextual data may indicate that the reason for the occurrence of the slipping event is due to a type of construction work that is known to generate debris such as sand, gravel, small rocks, etc. In one embodiment, the contextual data may be associated with data indicating a seasonality in which the slipping event has occurred. By way of example, the data may indicate that one or more trees within a location of a slipping event sheds leaves during a fall season and windy weather conditions, and the contextual data may indicate that the likelihood in which the location of the slipping event includes slip-inducing object is at "high" level due to the slipping event occurring during the fall season and windy weather conditions. In one embodiment, the contextual data may be associated with data indicating one or more wind directions that has impacted a location of a slipping event. For example, the data may indicate a direction at which the wind blows and areas in which slip-inducing objects gather within the location of the slipping event due to the direction of the wind. In one embodiment, the contextual data may be associated with data indicating a density of pedestrians and/or vehicles within a location of a slipping event. For example, if the density of pedestrians and/or vehicles within the location of the slipping event is at a "high" level, the likelihood in which a user of a micromobility vehicle will encounter one or more obstacles within the location of the slipping event and slip may also be at a "high" level. In one embodiment, the contextual data may be associated with data indicating an occurrence of a type of event occurring within or proximate to a location of a slipping event. For example, certain types of events such as festivals, concerts, sporting events, etc. are known to generate wastes within streets, thereby increasing the likelihood in which a road segment accumulates slip-inducing objects, such as garbage. As such, if the data indicate that said events have occurred within or proximate to a location of a slipping event, the contextual data may correlate said events as a cause of the slipping event.

The historical data further indicate attributes associated with a micromobility vehicle that has slipped during each slipping event of the historical data. Such attributes may indicate: (1) a type of micromobility vehicle; (2) a gross weight of the micromobility vehicle; (3) a number of wheels equipped by the micromobility vehicle; (4) a width of each wheel of the micromobility vehicle; (5) a maximum carriage capacity for the micromobility vehicle; (6) a top speed of the micromobility vehicle; (7) other specifications associated with the micromobility vehicle; or (8) a combination thereof.

The machine learning model receives the historical data and transforms the historical data into machine-readable and generalizable vectors. The machine learning model renders context around the historical data such that commonalities can be detected. Once the machine learning model translates the historical data into a vector format suitable to be used as a feature vector for machine learning, the assessment platform 123 trains the machine learning model on resulting pairs (i.e., observations as seen in the historical data and desired output value). For example, a desired output value may be defined by a number of expected slipping events while a micromobility vehicle traverses a road segment, and observations may be defined by aggregating all occurrences of past events in which slipping events have occurred on a particular road segment during a particular setting (e.g., all occurrences having the same vector representation). In one embodiment, the machine learning model may incorporate supervised machine learning techniques. In one embodiment, the machine learning model may incorporate a standard regression or classification task.

Once the machine learning model is trained, the machine learning model may receive input data indicating one or more locations for applying a prediction of one or more slipping events for a target micromobility vehicle and output data indicating a likelihood of which one or more slipping events will occur for the target micromobility vehicle at the one or more locations. Herein, a "target" modifier refers to an object of which a prediction of a slipping event is rendered for or an object used for rendering the prediction. The input data may include sensor data, road attribute data, contextual data, and vehicle attribute data associated with the target micromobility vehicle. The sensor data may indicate sensor readings acquired at the one or more locations (e.g., via one or more detection entities 113 at the one or more locations) and sensor readings acquired by the target micromobility vehicle (e.g., the vehicle 105). The road attribute data may indicate attributes of one or more road segments defined within the one or more locations. The contextual data may indicate various factors attributing to a potential occurrence of a slipping event, such as seasonality impacting the one or more locations, one or more weather conditions impacting the one or more locations, presence of one or more sources that generate or accumulate slip-inducing objects within the one or more locations, one or more street cleaning schedules associated with the one or more locations, presence of one or more types of POIs within the one or more locations, one or more wind directions at the one or more locations, pedestrian/vehicle density levels within the one or more locations, etc. In one embodiment, the sensor data, road attribute data, contextual data, and vehicle attribute data of the input data may correspond to the sensor data, road attribute data, travel data, and driver data of the historical data. In one embodiment, the machine learning model may be trained to incorporate transfer learning, thereby enabling the assessment platform 123 to render a prediction of slipping events in locations in which historical data for training the machine learning model is not available (e.g., sensor data, road attribute data, etc.). Transfer learning may be provided as a baseline application for predicting slipping events for micromobility vehicles in said locations until relevant data is collected in such area.

Figure 2:
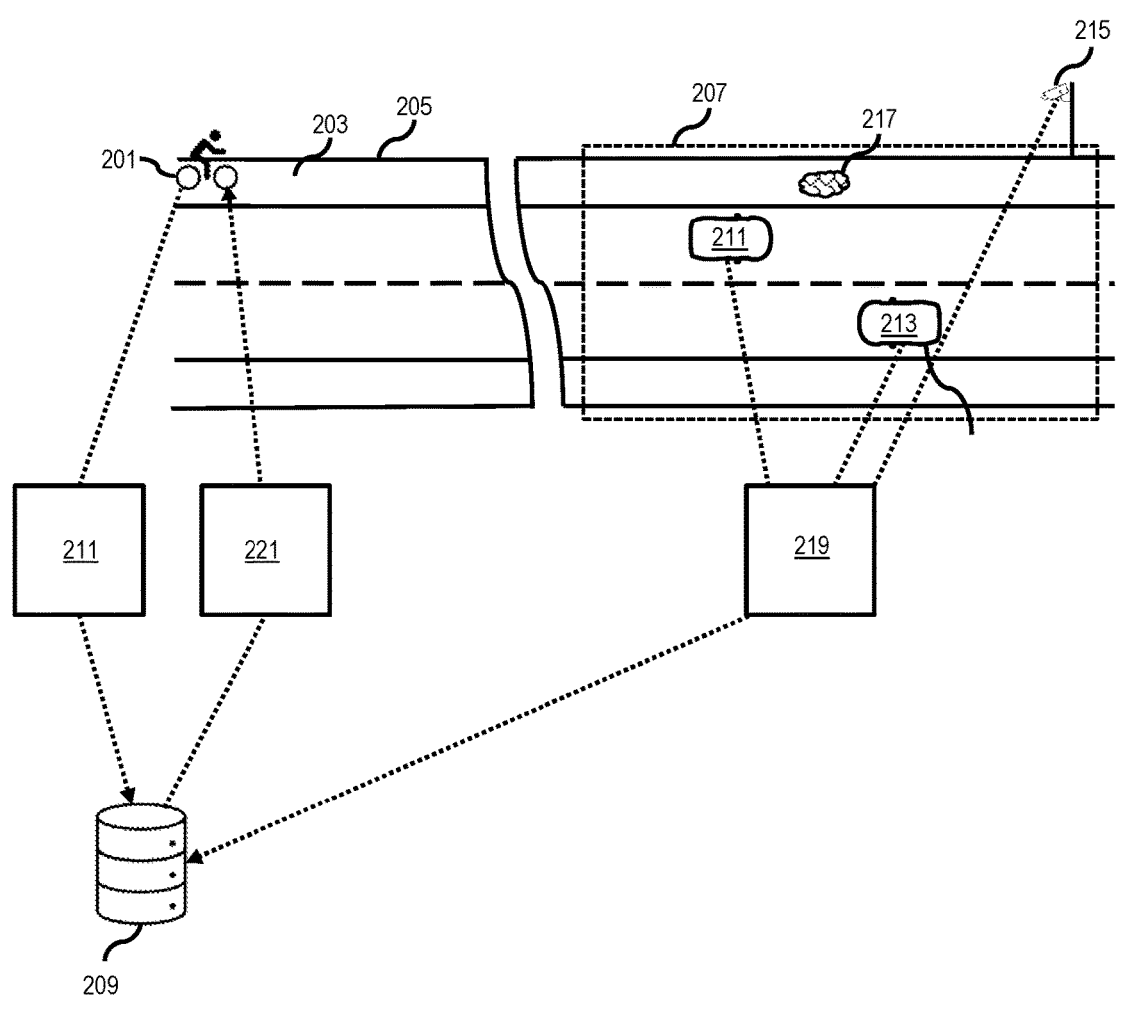
FIG. 2 illustrates an example scenario in which a machine learning model renders a prediction of a slipping event for a target micromobility vehicle.

FIG. 2 illustrates an example scenario 200 in which a machine learning model renders a prediction of a slipping event for a target micromobility vehicle. In the illustrated example, a target micromobility vehicle 201 is traversing a bike lane 203 within a road link 205 and generates a request for predicting a slipping event within a road segment 207. The target micromobility vehicle 201 is an e-bike. The target micromobility vehicle 201 may correspond to the vehicle 105 of FIG. 1. Herein, a road link should be construed as a contiguous, non-branching string of one or more road segments terminating in a node at each end. The road link 205 includes the road segment 207. The target micromobility vehicle 201 transmits to a server 209 first data packet 211 including the request, sensor data, and vehicle attribute data. The server 209 embodies a trained machine learning model for rendering a prediction of a slipping event. The server 209 may correspond to the assessment platform 123 of FIG. 1. The sensor data in the first data packet 211 may indicate a current speed level of the target micromobility vehicle 201, a load weight of the target micromobility vehicle 201, a current position of the target micromobility vehicle 201, a tire pressure level of the target micromobility vehicle 201, and other sensor data associated with the target micromobility vehicle 201. In the illustrated example, a first vehicle 212 and a second vehicle 213 are traversing the road segment 207, and a surveillance post 215 is positioned at the periphery of the road segment 207. A pile of leaves 217 is located within the bike lane 203 of the road segment 207. The first vehicle 212, second vehicle 213, and the surveillance post 215 detect the presence and location of the pile of leaves 217 and transmit second data packets 219 to the server 209. The first vehicle 212, the second vehicle 213, and the surveillance post 215 may correspond to the detection entities 113 of FIG. 1. The second data packets 219 include sensor data indicating the presence and location of the pile of leaves 217, road attribute data associated with the road segment 207, a weather condition impacting the road segment 207, and other attribute data associated with an environment of the road segment 207. In addition to receiving the first and the second data packets 211 and 219, the server 209 may acquire road attribute data and contextual data associated with the road segment 207 from various data sources (e.g., database 125, detection entities 113, services platform 115, content providers 119, etc.). The first data packet 209, the second data packets 219, and the additional data are provided as input data to the machine learning model. In response, the machine learning model generates and transmits to the target micromobility vehicle 201 a third data packet 221 including a prediction indicating a likelihood of which a slipping event will occur at the road segment 207 for the target micromobility vehicle 201. In one embodiment, the third data packet 221 may include a routing information including one or more route of which the target micromobility vehicle 201 can traverse to avoid encountering the pile of leaves 217.

Returning to FIG. 1, the assessment platform 123 utilizes outputs of the machine learning model to provide various applications. In one embodiment, the assessment platform 123 uses the output of the machine learning model to generate a map layer including one or more locations, where each of the one or more locations indicates a likelihood in which a slipping event will occur for a micromobility vehicle at said location at one or more periods. In one embodiment, the assessment platform 123 may generate a route to a destination based on one or more locations in which a slipping event will occur for a micromobility vehicle. For example, the assessment platform 123 may generate a route to a destination that avoids one or more locations having a "high" level of likelihood of a slipping event occurring therein. In one embodiment, the assessment platform 123 may generate a notification that discourages users of micromobility vehicles to traverse one or more locations that is predicted to have a "high" level of likelihood of slipping events occurring therein. In one embodiment, if micromobility vehicles are shared vehicles that can be rented out by consumers for use, the assessment platform 123 may map locations that are predicted to have a "high" level of likelihood of slipping events occurring therein and destinations for returning the rented micromobility vehicles. Based on the locations of predicted slipping events and the destinations, the assessment platform 123 may identify renting locations at which the consumers may rent out the micromobility vehicles such that routes from the renting locations to the destinations avoid the locations that are predicted to have a "high" level of likelihood of slipping events occurring therein. Similarly, the assessment platform 123 may map locations that are predicted to have a "high" level of likelihood of slipping events occurring therein and renting locations for micromobility vehicles, and based on the predicted locations and the renting locations, the assessment platform 123 may identify destinations for returning the rented micromobility vehicles such that routes from the renting locations to the destinations avoids the locations that are predicted to have a "high" level of likelihood of slipping events occurring therein. In one embodiment, if the assessment platform 123 determines that a route from a renting location for renting a micromobility vehicle to a destination for returning the micromobility vehicle includes a location that is predicted to have a "high" level of likelihood of a slipping event occurring therein, the assessment platform 123 may identify an alternative type of micromobility vehicle that is better suited for traversing the predicted location. For example, the assessment platform 123 may recommend an e-bike in lieu of an e-scooter if the assessment platform determines that the route includes the location that is predicted to have a "high" level of likelihood of a slipping event occurring therein. In one embodiment, if the assessment platform 123 determines that a route of a user of a micromobility vehicle includes a location that is predicted to have a "high" level of likelihood of a slipping event occurring therein, the assessment platform 123 may provide a suggestion to the user to use a protective equipment (e.g., helmet, gloves, knee guards, elbow guards, etc.). In one embodiment, if the assessment platform 123 determines that: (1) a route of a user of a micromobility vehicle includes a location that is predicted to have a "high" level of likelihood of a slipping event occurring therein; and (2) a major contributing factor for the "high" level of likelihood is due to temporal aspects associated with the location (e.g., a street sanitation vehicle has not cleaned the location for a long duration, precipitation has recently formed within the location, severe wind conditions are impacting the location, etc.), the assessment platform 123 may recommend the user to use the micromobility vehicle at one or more later time points where the level of likelihood is predicted to decrease.

In one embodiment, the machine learning model may output a reason as to why a slipping event for a micromobility vehicle is likely to occur at a location. For example, the reason may be due to: (1) certain attributes associated with a road segment within the location (e.g., presence of a crack or pothole within the road segment, difference in orientations between a concrete pavement and a neighboring concrete pavement rendering a sharp bump, etc.); (2) a schedule in which a street sanitation entity cleans and disposes garbage, leaves, dirt, gravel, and/or other slip-inducing objects within the location; (3) presence of the slip-inducing objects within the location; (4) a schedule in which one or more waste containers within the location of the slipping event is emptied; (5) proximity of the location relative to types of POIs that are known to generate slip-inducing objects (e.g., sand, gravel, glass, etc.); (6) proximity of the location relative to types of construction works that are known to generate slip-inducing objects; (7) a seasonality in which the location is being encountered by the micromobility vehicle; (8) proximity of the location relative to a type of plants that have leaves and shed leaves during certain seasons; (9) one or more wind directions that causes slip-inducing objects to accumulate at certain areas within the location; (10) density of pedestrians and/or vehicles within the location; (11) proximity of the location relative to a type of event (e.g., festivals, concerts, sporting events); (12) presence of precipitation at the location; (13) sensor data indicating presence of slip-inducing objects at the location; or (13) a combination thereof.

Figure 3:
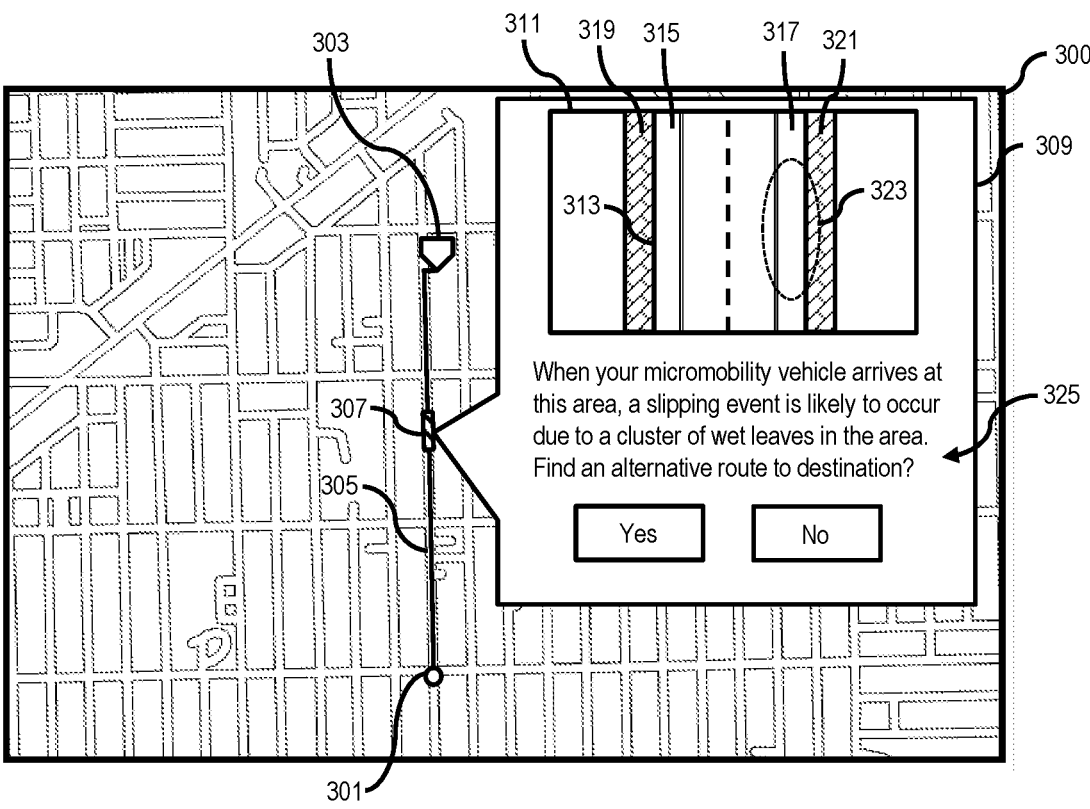
FIG. 3 illustrates an example visual representation indicating a location in which a slipping event for a micromobility vehicle is likely to occur.

The assessment platform 123 is capable of generating notifications and/or other types of information based on an output of the machine learning model. The assessment platform 123 may transmit the notifications to the UE 101 and/or a user interface associated with the vehicle 105. The notification may include sound notification, display notification, vibration, or a combination thereof. In one embodiment, the assessment platform 123 may cause the UE 101 and/or the user interface associated with the vehicle 105 to generate a visual representation indicating the output of the machine learning model. For example, FIG. 3 illustrates an example visual representation 300 indicating a location in which a slipping event for a micromobility vehicle is likely to occur. In the illustrated example, the visual representation 300 displays a map including an avatar 301 indicating a current location of a micromobility vehicle, a destination 303, a route 305 to the destination 303, and a highlighted section 307 of the route 305. The machine learning model has generated output data indicating that a slipping event is likely occur at the highlighted section 307 when the micromobility vehicle encounters the location of the highlighted section 307 due to the highlighted section 307 having a cluster of wet leaves. To provide a detailed information on the location of the cluster of wet leaves, the visual representation 300 displays a message window 309 including a detailed, zoomed-in view 311 of the highlighted section 307. In the view 311, a single carriageway road segment 313 including two bike lanes 315 and 317 and two sidewalks 319 and 321 adjacent to the road segment 313 is displayed. Additionally, a zone 323 is presented within the view 311 to emphasize the location of the cluster of wet leaves. The message window 309 further includes a message prompt 325 stating "WHEN YOUR MICROMOBILITY VEHICLE ARRIVES AT THIS AREA, A SLIPPING EVENT IS LIKELY TO OCCUR DUE TO A CLUSTER OF WET LEAVES IN THE AREA. FIND AN ALTERNATIVE ROUTE TO DESTINATION?"

The assessment platform 123 can be implemented in hardware, firmware, software, or a combination thereof. Though depicted as a separate entity in FIG. 1, it is contemplated that the assessment platform 123 may be implemented for direct operation by the UE 101, the vehicle 105, the services platform 115, one or more of the content providers 119, or a combination thereof. As such, the assessment platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in predicting slipping events for micromobility vehicles. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the assessment platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
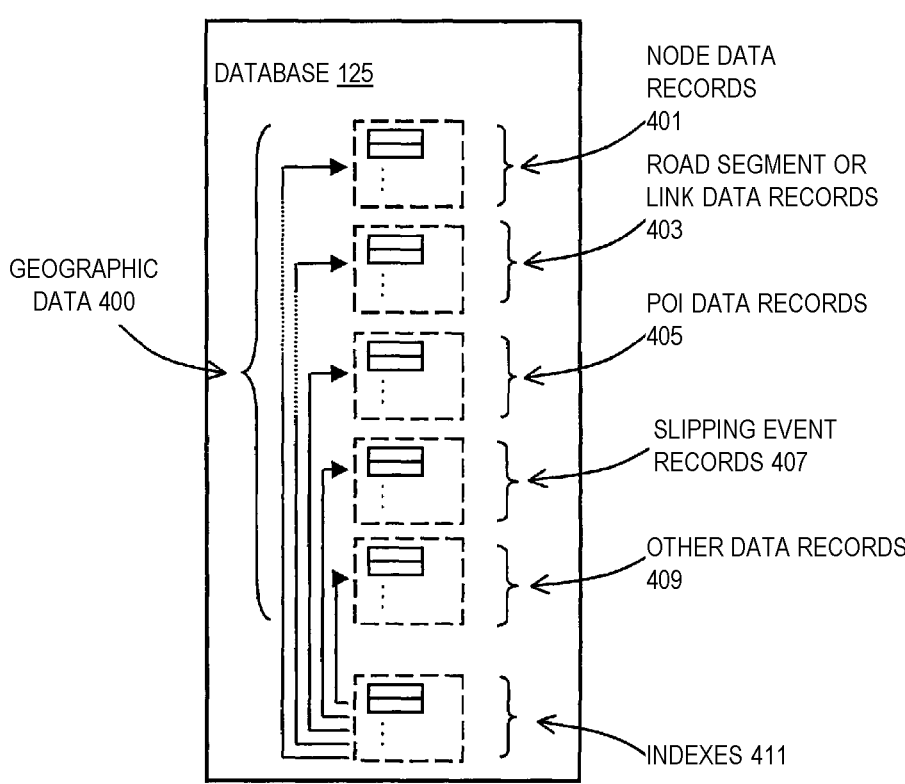
FIG. 4 illustrates a diagram of a database of FIG. 1.

FIG. 4 is a diagram of a database 125 (e.g., a map database), according to one embodiment. In one embodiment, the database 125 includes data 200 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multi-level tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grids. Because of the numbering system, the exact position of any tile in any level of the map tile grid or projection may be uniquely determined from the tile ID.

As shown, the database 125 includes node data records 401, road segment or link data records 403, POI data records 405, slipping event records 407, other records 409, and indexes 411, for example. More, fewer or different data records can be provided. In one embodiment, additional data records (not shown) can include cartographic ("carto") data records, routing data, and maneuver data. In one embodiment, the indexes 411 may improve the speed of data retrieval operations in the database 125. In one embodiment, the indexes 411 may be used to quickly locate data without having to search every row in the database 125 every time it is accessed.

In exemplary embodiments, the road segment data records 403 are links or segments representing roads, streets, or paths, as can be used in the calculated route or recorded route information for determination of one or more personalized routes. The node data records 401 are end points (such as intersections) corresponding to the respective links or segments of the road segment data records 403. The road link data records 403 and the node data records 401 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 205. The database 125 can also include data about places, such as cities, towns, or other communities, and other geographic features, such as bodies of water, mountain ranges, etc. Such place or feature data can be part of the POI data records 405 or can be associated with POIs or POI data records 405 (such as a data point used for displaying or representing a position of a city).

The slipping event records 407 include historical data indicating events in which micromobility vehicles have slipped. The historical data include sensor data acquired by sensors equipped by the micromobility vehicles. The sensor data include readings indicating that the micromobility vehicles have slipped and other relevant sensor data acquired during periods at which the micromobility vehicles have slipped. The sensor data may also indicate attributes of objects within environments in which the micromobility vehicle have slipped. The historical data further include data acquired from various sources, such as one or more detection entities 113, the services platform 115, content providers 119, the database 125, etc. Such data may also be sensor data and/or road attribute data associated with the locations of the slipping events. The historical data further include contextual data associated with the slipping event. The contextual data may indicate reasons as to why the slipping event has occurred at the location of the event. The historical data further indicate attributes associated with a micromobility vehicle that has slipped during each slipping event of the historical data.

Other records 409 may include user behavior data for maneuvering micromobility vehicles. Such data may correlate a pattern of which a user maneuvers a micromobility vehicle to one or more locations having one or more types of road attributes. For example, the data may indicate that a user sharply steers a handle of an e-scooter when the user encounters an intersection or that the user abruptly executes a braking maneuver on a micromobility vehicle when the user approaches a stop sign. It is contemplated that such data may be input to a machine learning model for predicting whether a user of a micromobility vehicle will encounter a slipping event.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for predicting slipping events for micromobility vehicles may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 5:
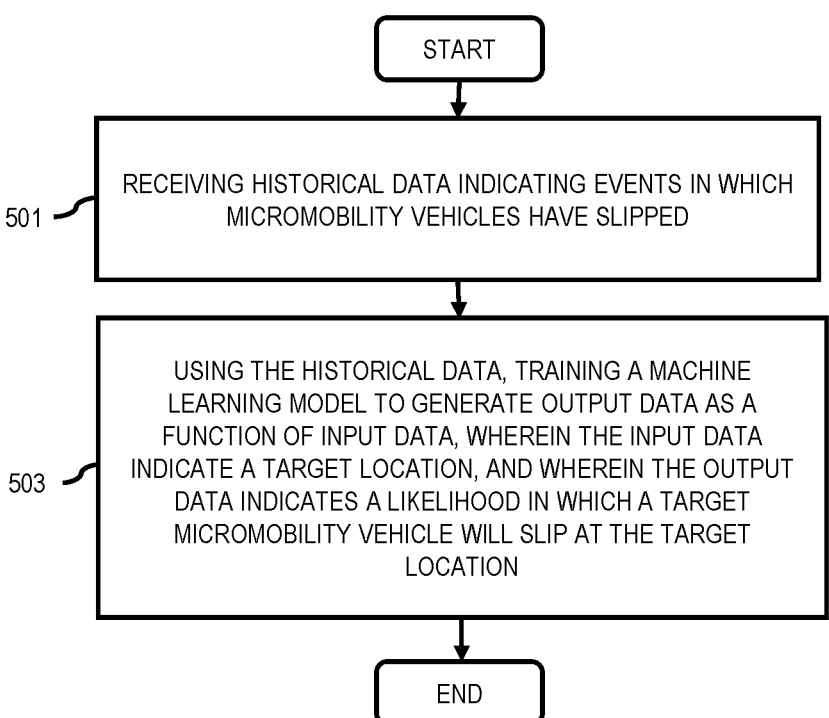
FIG. 5 illustrates a flowchart of a process for training a machine learning model to predict slipping events for micromobility vehicles.
Figure 8:
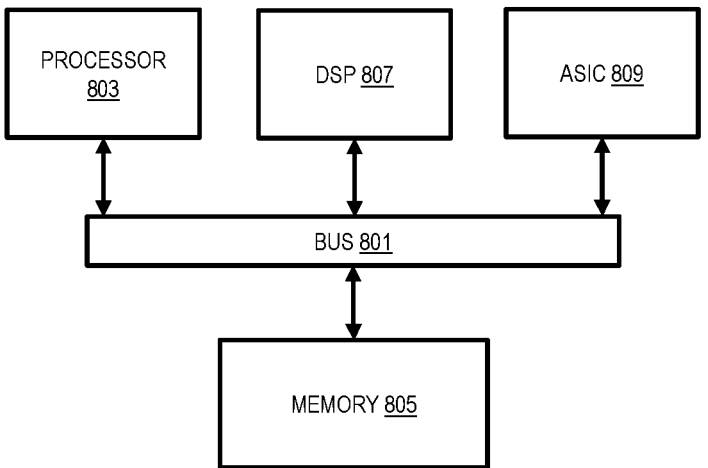
FIG. 8 illustrates a chip set or chip upon which an embodiment may be implemented.

FIG. 5 is a flowchart of a process 500 for training a machine learning model to predict slipping events for micromobility vehicles, according to one embodiment. In one embodiment, the assessment platform 123 performs the process 500 and is implemented in, for instance, a chip set including a processor and a memory as shown in FIG. 8.

In step 501, the assessment platform 123 receives historical data indicating events in which micromobility vehicles have slipped. The historical data include sensor data acquired by sensors equipped by the micromobility vehicles. The sensor data include reading indicating that the micromobility vehicles have slipped. For example, a traction sensor, an accelerometer, and/or a gyro sensor equipped by the micromobility vehicle may generate readings indicating that the vehicle has slipped. The historical data include additional sensor data, such as image data acquired by one or more cameras equipped by the micromobility vehicles and/or one or more detection entities 113 proximate to the locations of the events during the periods of the events. The sensor data may reflect data acquired during periods in which slipping events for micromobility vehicles have occurred, preceding periods leading up to the periods, following periods subsequent to the periods, or a combination thereof. The sensor data indicate, for each slipping event of the historical data: (1) one or more images of a setting of said slipping event; (2) one or more levels of coefficient of friction at the location of the slipping event; (3) one or more speed levels at which a micromobility vehicle was traversing during said slipping event; (4) a maneuver executed by the micromobility vehicle during said slipping event (e.g., braking, steering, acceleration, or a combination thereof); (5) an angle or inclination/declination of the location of the slipping event; (6) an amount of weight exerted on the micromobility vehicle; (7) a degree at which the micromobility has slipped (e.g., a slight slip or the micromobility vehicle has fallen); (8) whether a user of the micromobility has moved relative to the micromobility vehicle (e.g., a user swinging the upper body thereof); (9) tire pressure levels of the micromobility vehicle; or (10) a combination thereof. The historical data further include data acquired from various sources, such as one or more detection entities 113, the services platform 115, content providers 119, the database 125, etc. Such data may indicate: (1) road attributes associate with the location of the slipping event; (2) a location/orientation of one or more road objects within the location of the slipping event; (3) one or more types of terrains within the location of the slipping event; (4) an angle or inclination/declination of the location of the slipping event; (5) locations and types of sources that generate slip-inducing objects within or proximate to the location of the slipping event; (6) a weather condition that has impacted the slipping event; (7) one or more POIs within or proximate to the location of the slipping event; or (8) a combination thereof. The historical data further include contextual data associated with the slipping event. The contextual data may indicate reasons as to why the slipping event has occurred at the location of the event. The historical data further indicate attributes associated with a micromobility vehicle that has slipped during each slipping event of the historical data. Such attributes may indicate: (1) a type of micromobility vehicle; (2) a gross weight of the micromobility vehicle; (3) a number of wheels equipped by the micromobility vehicle; (4) a width of each wheel of the micromobility vehicle; (5) a maximum carriage capacity for the micromobility vehicle; (6) a top speed of the micromobility vehicle; (7) other specifications associated with the micromobility vehicle; or (8) a combination thereof.

In step 503, the assessment platform 123 trains the machine learning model to output a likelihood in which a likelihood in which a target micromobility vehicle will slip at the target location. In one embodiment, the assessment platform 123 transforms the historical data into machine-readable and generalizable vectors. The machine learning model renders context around the historical data such that commonalities can be detected. Once the machine learning model translates the historical data into a vector format suitable to be used as a feature vector for machine learning, the assessment platform 123 trains the machine learning model on resulting pairs (i.e., observations as seen in the historical data and desired output value). In one embodiment, the machine learning model may incorporate a standard regression or classification task.

Figure 6:
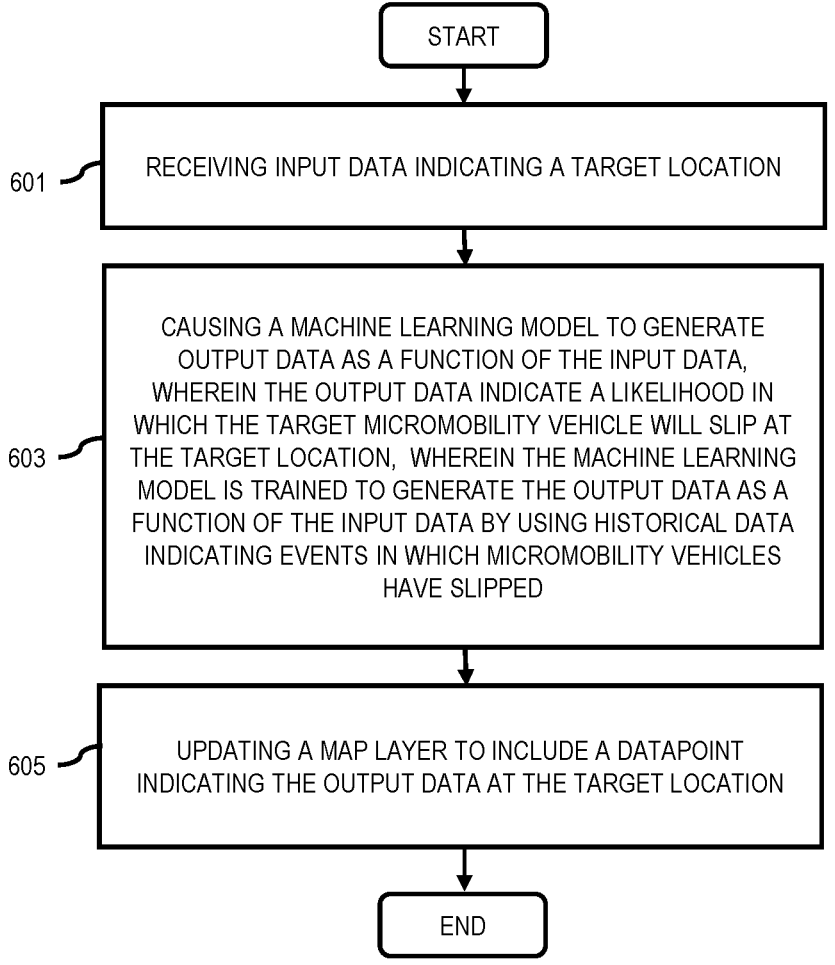
FIG. 6 illustrates a flowchart of a process for providing a map layer of one or more slipping events for a target micromobility vehicle.

FIG. 6 is a flowchart of a process 600 for providing a map layer of one or more slipping events for a target micromobility vehicle, according to one embodiment. In one embodiment, the assessment platform 123 performs the process 600 and is implemented in, for instance, a chip set including a processor and a memory as shown in FIG. 8.

In step 601, the assessment platform 123 receives input data indicating a target location. The input data may further indicate sensor data acquired at the target location and contextual data associated with target location. Such data may be acquired by one or more detection entities 113 that are within the target location, the services platform 115, and/or the content providers 119.

In step 603, the assessment platform 123 causes a machine learning model to generate output data as a function of the input data. The output data indicate a likelihood in which the target micromobility vehicle will slip at the target location. The machine learning model is trained to generate the output data as a function of the input data by using historical data indicating events in which micromobility vehicles have slipped.

In step 605, the assessment platform 123 updates the map layer to include a datapoint indicating the output data at the target location. In one embodiment, the map layer includes one or more other datapoints indicating one or more other likelihoods in which the target micromobility vehicle will slip at one or more other target locations.

The system, apparatus, and methods described herein reliably predict locations in which slipping events for micromobility vehicles will occur, thereby enabling user devices available to users of micromobility vehicles to provide warnings and notifications associated with the predictions. Since the system, apparatus, and methods provide warnings regarding potential slipping events for micromobility vehicles, accidents for micromobility vehicles and users of micromobility vehicles are decreased in a road network.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
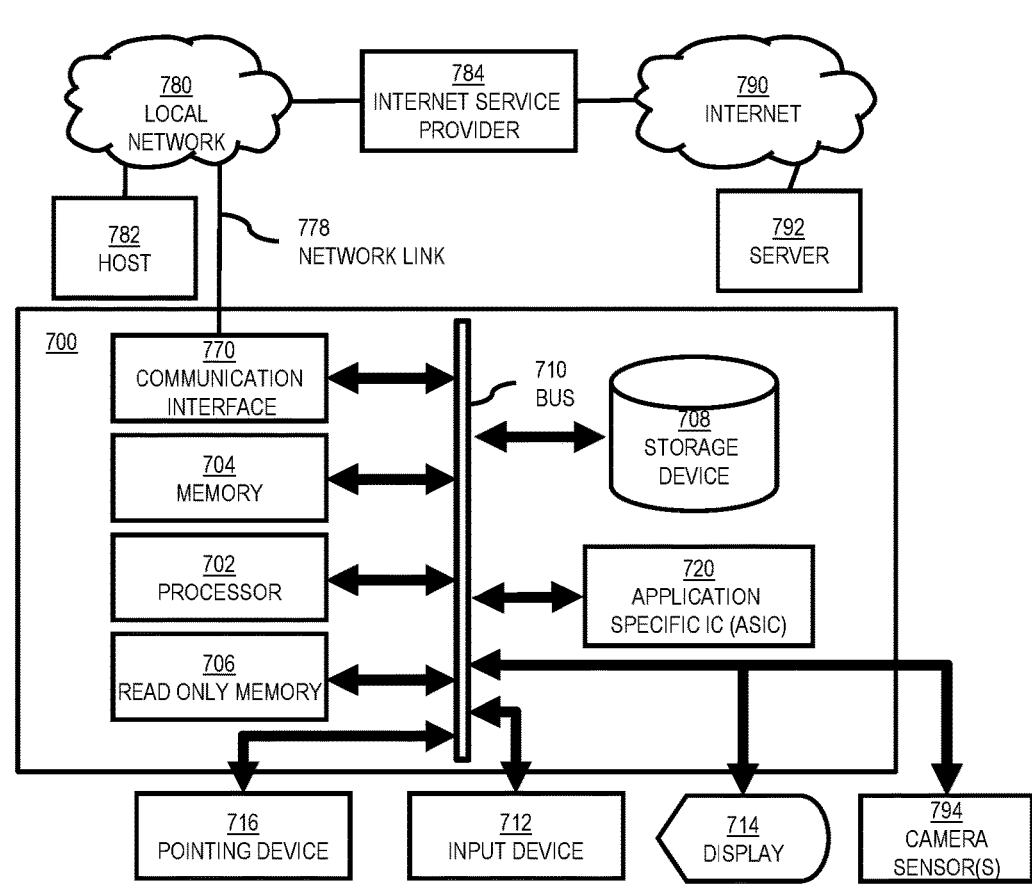
FIG. 7 illustrates a computer system upon which an embodiment may be implemented.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to predict slipping events for micromobility vehicles as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of predicting slipping events for micromobility vehicles.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to predicting slipping events for micromobility vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for predicting slipping events for micromobility vehicles. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 77 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for predicting slipping events for micromobility vehicles, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 121 for predicting slipping events for micromobility vehicles to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 782 connected to the Internet hosts a process that provides a service in response to information received over the Internet. For example, server host 782 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 782 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to predict slipping events for micromobility vehicles as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of predicting slipping events for micromobility vehicles.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real-time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors. The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to predict slipping events for micromobility vehicles. The memory 805 also stores the data associated with or generated by the execution of the inventive steps.

Figure 9:
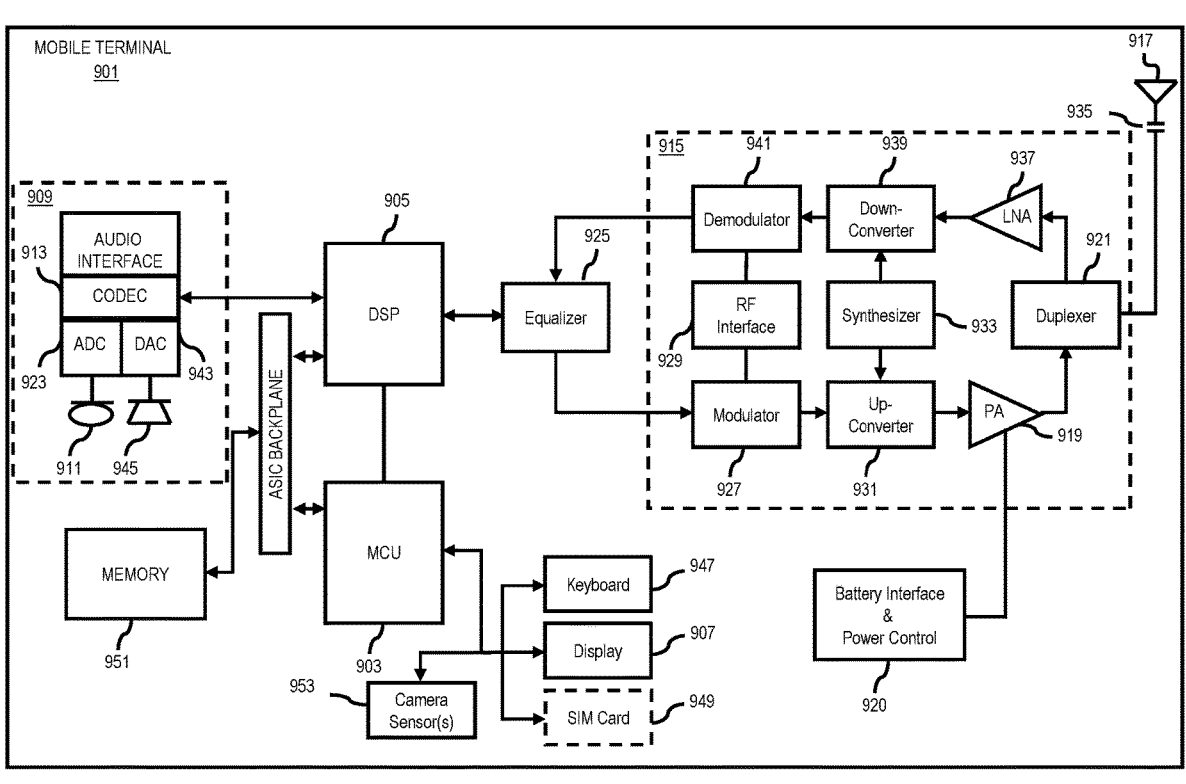
FIG. 9 illustrates a diagram of exemplary components of a mobile terminal for communications, which is capable of operating in the system of FIG. 1.

FIG. 9 is a diagram of exemplary components of a mobile terminal 901 (e.g., a mobile device or vehicle or part thereof) for communications, which is capable of operating in the system of FIG. 1, according to one embodiment. In some embodiments, mobile terminal 901, or a portion thereof, constitutes a means for performing one or more steps of predicting slipping events for micromobility vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of predicting slipping events for micromobility vehicles. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit

903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to predict slipping events for micromobility vehicles. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Further, one or more camera sensors 953 may be incorporated onto the mobile station 901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
 receive historical data indicating events in which micromobility vehicles have slipped, the historical data indicating slip-inducing objects within locations of the events, proximity of sources of the slip-inducing objects relative to the locations, and one or more factors that cause the slip-inducing objects to be disposed within the locations, wherein the slip-inducing objects are leaves, garbage, or a combination thereof, wherein the sources are plants, waste containers, or a combination thereof, and wherein the one or more factors is defined by a season in which each of the events has occurred, timings in which the waste containers are emptied, or a combination thereof; and
 using the historical data, training a machine learning model to generate output data as a function of input data, wherein the input data indicate a target location and include contextual data associated with the target location, and wherein the output data indicates a likelihood in which a target micromobility vehicle will slip at the target location.

2. The apparatus of claim 1, wherein the historical data further indicate one or more weather conditions of the events.

3. The apparatus of claim 1, wherein the historical data further indicate timings in which street cleaning entities clean the locations.

4. The apparatus of claim 1, wherein the historical data further indicate one or more wind directions of the events.

5. The apparatus of claim 1, wherein the historical data further indicate one or more metallic surface areas within the locations of the events.

6. A non-transitory computer-readable storage medium having computer program code instructions stored therein, the computer program code instructions, when executed by at least one processor, cause the at least one processor to:
 receive input data indicating a target location and including contextual data associated with the target location; and
 cause a machine learning model to generate output data as a function of the input data, wherein the output data indicate a likelihood in which a target micromobility vehicle will slip at the target location, wherein the machine learning model is trained to generate the output data as a function of the input data by using historical data indicating events in which micromobility vehicles have slipped, wherein the historical data indicate slip-inducing objects within locations of the events, proximity of sources of the slip-inducing objects relative to the locations, and one or more factors that cause the slip-inducing objects to be disposed within the locations, wherein the slip-inducing objects are leaves, garbage, or a combination thereof, wherein the sources are plants, waste containers, or a combination thereof, and wherein the one or more factors is defined by a season in which each of the events has occurred, timings in which the waste containers are emptied, or a combination thereof.

7. The non-transitory computer-readable storage medium of claim 6, wherein the contextual data indicate leaves within the target location, one or more plants proximate to the target location, and a season in which the target micromobility is estimated to encounter the target location.

8. The non-transitory computer-readable storage medium of claim 6, wherein the contextual data indicate garbage disposed within the target location, one or more waste containers proximate to the target location, and timings in which the waste containers proximate to the target location are emptied.

9. The non-transitory computer-readable storage medium of claim 6, wherein the contextual data indicate one or more weather conditions of the target location.

10. The non-transitory computer-readable storage medium of claim 6, wherein the contextual data indicate timings in which a street cleaning entity cleans the target location.

11. The non-transitory computer-readable storage medium of claim 6, wherein the contextual data indicate one or more wind directions within the target location.

12. The non-transitory computer-readable storage medium of claim 6, wherein the contextual data indicate one or more metallic surface areas within the target location.

13. A method of providing a map layer of one or more slipping events for a target micromobility vehicle, the method comprising:
 receiving input data indicating a target location and including contextual data associated with the target location;
 causing a machine learning model to generate output data as a function of the input data, wherein the output data indicate a likelihood in which the target micromobility vehicle will slip at the target location, wherein the machine learning model is trained to generate the output data as a function of the input data by using historical data indicating events in which micromobility vehicles have slipped, wherein the historical data indicate slip-inducing objects within locations of the events, proximity of sources of the slip-inducing objects relative to the locations, and one or more factors that cause the slip-inducing objects to be disposed within the locations, wherein the slip-inducing objects are leaves, garbage, or a combination thereof, wherein the sources are plants, waste containers, or a combination thereof, and wherein the one or more factors is defined by a season in which each of the events has occurred, timings in which the waste containers are emptied, or a combination thereof; and updating the map layer to include a datapoint indicating the output data at the target location.

14. The method of claim 13, wherein the map layer includes one or more other datapoints indicating one or more other likelihoods in which the target micromobility vehicle will slip at one or more other target locations.

15. The method of claim 13, wherein the contextual data indicate leaves within the target location, one or more plants proximate to the target location, and a season in which the target micromobility is estimated to encounter the target location.

16. The method of claim 13, wherein the contextual data indicate garbage disposed within the target location, one or more waste containers proximate to the target location, and timings in which the waste containers proximate to the target location are emptied.

17. The method of claim 13, wherein the contextual data indicate one or more weather conditions of the target location.

18. The method of claim 13, wherein the contextual data indicate timings in which a street cleaning entity cleans the target location.

* * * * *